US012761382B2

(12) United States Patent
Ryzhov et al.

(10) Patent No.: US 12,761,382 B2
(45) Date of Patent: Oct. 13, 2026

(54) PASSIVE LOW FREQUENCY SEISMIC (LFS) SYSTEM AND METHOD TO DETECT AND IMAGE SUBSURFACE SEARCH OBJECTS AND FLUID PROPERTIES

(71) Applicant: Tenzor Geo LTD, Aberdeen (GB)

(72) Inventors: Vasiliy Ryzhov, Kazan (RU); Sergey Feofilov, Kazan (RU); Ilshat Sharapov, Kazan (RU); Dmitry Ryzhov, Kazan (RU); Roy Bitrus, Aberdeen (GB); Ildar Gadeev, Kazan (RU)

(73) Assignee: Tenzor Geo LTD, Aberdeen (GB)

( * ) Notice: Subject to any disclaimer, the term of this patent is extended or adjusted under 35 U.S.C. 154(b) by 262 days.

(21) Appl. No.: 18/410,721

(22) Filed: Jan. 11, 2024

(65) Prior Publication Data

US 2024/0264318 A1 Aug. 8, 2024

Related U.S. Application Data

(60) Provisional application No. 63/483,463, filed on Feb. 6, 2023.

(51) Int. Cl.
*G01V 1/00* (2024.01)
*G01V 1/28* (2006.01)

(52) U.S. Cl.
CPC .............. *G01V 1/005* (2013.01); *G01V 1/282* (2013.01); *G01V 2210/324* (2013.01)

(58) Field of Classification Search
CPC .. G01V 1/005; G01V 1/282; G01V 2210/324; G01V 2210/123; G01V 1/288
USPC ........................................................... 367/23
See application file for complete search history.

(56) References Cited

U.S. PATENT DOCUMENTS

| | | | | |
|---|---|---|---|---|
| 8,737,165 | B2 | 5/2014 | Halliday et al. | |
| 9,075,163 | B2 | 7/2015 | Robertsson et al. | |
| 9,121,965 | B2 | 9/2015 | Al-Jadani | |
| 9,945,970 | B1 * | 4/2018 | Abel | G01V 1/288 |
| 2014/0160881 | A1 * | 6/2014 | Love | G01V 1/288 367/7 |

(Continued)

FOREIGN PATENT DOCUMENTS

| | | | |
|---|---|---|---|
| CA | 2963823 | C | 5/2022 |
| CN | 112918477 | A | 6/2021 |

(Continued)

OTHER PUBLICATIONS

Iqbal et al. ("Detection and denoising of microseismic events using time-frequency representation and tensor decomposition." IEEE access 6 (2018): 22993-23006., "Iqbal") (Year: 2018).*

(Continued)

*Primary Examiner* — Yuqing Xiao
*Assistant Examiner* — Christopher Richard Walker
(74) *Attorney, Agent, or Firm* — ESPE Legal Consultancy FZ-LLC

(57) ABSTRACT

Systems and methods for applying passive low frequency seismic (LFS) techniques to estimate the presence of a search object, its properties, and properties of the exterior environment for onshore or offshore surveys. The process includes the acquisition of LFS data, multi-phase data simulation and data processing using advanced processing graphs that includes seismic interferometry approaches and adapted inversion techniques.

20 Claims, 6 Drawing Sheets

(56) References Cited

U.S. PATENT DOCUMENTS

| | | | |
|---|---|---|---|
| 2021/0026359 | A1 | 1/2021 | MacGregor et al. |
| 2023/0219599 | A1 | 7/2023 | Filipenko et al. |

FOREIGN PATENT DOCUMENTS

| | | | |
|---|---|---|---|
| RU | 2336541 | C2 | 10/2008 |
| RU | 2648015 | C1 | 3/2018 |

OTHER PUBLICATIONS

Li et al. ("Microseismic joint location and anisotropic velocity inversion for hydraulic fracturing in a tight Bakken reservoir." Geophysics 79.5 (2014): C111-C122., "Li") (Year: 2014).*

Saade et al. ("Influence of seismic anisotropy on the cross correlation tensor: numerical investigations." Geophysical Journal International 201.2 (2015): 595-604., "Saade") (Year: 2015).*

Issa et al. ("Passive seismic imaging at reservoir depths using ambient seismic noise recorded at the Otway CO2 geological storage research facility." Geophysical Journal International 209.3 (2017): 1622-1628., "Issa") (Year: 2017).*

* cited by examiner

PASSIVE LOW FREQUENCY SEISMIC (LFS) SYSTEM AND METHOD TO DETECT AND IMAGE SUBSURFACE SEARCH OBJECTS AND FLUID PROPERTIES

RELATED APPLICATION

This application claims priority to U.S. Provisional Application No. 63/483,463, filed Feb. 6, 2023, which is incorporated herein in its entirety.

TECHNICAL FIELD

This invention relates to systems and methods that are used to acquire and analyze ambient background seismic waves to investigate geologic processes in subsurface environments. The invention can be applied in the oil and gas industry, specifically for hydrocarbon prospecting and investigating subsurface formations that have a seismic contrast of impedance due to contrasting properties of media. The system and methods can be applied in acquiring data in both onshore and offshore environments.

BACKGROUND

Passive low frequency seismic (LFS) techniques are used in the exploration for natural resources, the study of Earth's structure and composition, and the monitoring of environmental and man-made changes in the Earth's surface.

Low frequencies (<20 Hz) are delicate in nature and can be easily contaminated by man-made noise. Serious misinterpretation issues can occur when the acquired low frequency seismic data is not processed accurately. As anthropogenic noise can produce similar signals as the targeted direct hydrocarbon indicator (DHI) in the same frequency domain. This means that acquisition of these passive low frequencies requires sensitive recording equipment with broadband seismometers. Processing of the acquired signal data also requires specialised techniques.

Compressional body waves from noise are more challenging to retrieve than surface waves because their reflection amplitudes decay more rapidly with distance and the demands on the distribution of the ambient-noise sources are more severe. In general, surface wave noise drowns out the subtle body-wave noise required for imaging subsurface structures with high resolution. In practice, at frequencies lower than 0.1 Hz, white spatial distribution of random noise is lacking, and events and energy of Rayleigh waves dominate the energy of body waves.

Therefore, there is a need for improved systems and methods for estimating the properties of search objects.

SUMMARY

Systems and methods are disclosed for simulation of seismic responses for various petrophysical parameters of various search objects, such as underground structures or exterior media. Vertically propagating compressional body-waves are extracted from a microseismic ambient background wave field collected from a predetermined area comprising a search object of interest. Inversion techniques are used to predict the properties of the search object.

A method for detecting and imaging subsurface search objects comprises positioning a plurality of sensors to record microseismic signals in a predetermined area. Microseismic signals are recorded in the predetermined area comprising waves with a vertical component and a horizontal component. The recorded microseismic signals are processed by filtering noise in the recorded microseismic signals associated with a correlated horizontal wave component from the vertical wave component. Further processing comprises filtering a narrowband harmonic component of the recorded microseismic signals.

Vertically propagating waves are retrieved from the microseismic ambient background in the recorded microseismic signals by excluding broadband interference from the microseismic ambient background wave field, accumulation of the tensor of cross-correlation functions, suppressing the scattered component of the Rayleigh surface wave using the tensor of the cross-correlation functions; and performing filtering on the collection of cross-correlation functions to exclude an inclined component in the gathering of cross-correlation functions.

The expected vertical component in the predetermined area is modeled by way of a seismic simulation that enables the propagation of seismic waves in a multiphase medium. The modeling is based on prior data for the predetermined area, including vertical seismic profile, depth and time maps, or elevation data. A predicted subsurface earth structure is generated by comparing the recorded, processed microseismic signals to the modeled expected vertical component in the predetermined area.

In an embodiment, the plurality of sensors are positioned in a grid and the predetermined area comprises an observation area and a study area, the study area located within the observation area. In an embodiment, the plurality of sensors are configured for simultaneous recording. In an embodiment, at least two of the plurality of sensors positioned in a grid comprise pairs with a middle point between them to which a cross-correlation tensor is assigned.

In an alternative embodiment, the predetermined area is divided into a plurality of microgroups.

In an embodiment, the predicted subsurface earth structure corresponds to the study area. In an embodiment, the search objects comprise an underground reservoir.

A system for detecting and imaging subsurface search objects comprises a plurality of sensors for recording microseismic signals in a predetermined area. The system also comprises a processing module configured to process microseismic signals by filtering noise in the recorded microseismic signals associated with a correlated horizontal wave component from a vertical wave component and filtering a narrowband harmonic component of the recorded microseismic signals.

The processing module is also configured for retrieving the vertically propagating waves from the microseismic ambient background in the recorded microseismic signals by excluding broadband interference from the microseismic ambient background wave field, accumulation of the tensor of cross-correlation functions, suppressing the scattered component of the Rayleigh surface wave using the tensor of the cross-correlation functions, and performing filtering on the collection of cross-correlation functions to exclude an inclined component in the gathering of cross-correlation functions.

The system further comprises a simulation module configured to model the expected vertical component in the predetermined area by way of a seismic simulation that enables the propagation of seismic waves in a multiphase medium. The modeling is based on prior data for the predetermined area, including vertical seismic profile, depth and time maps, or elevation data. The simulation module is configured to generate a predicted subsurface earth structure by comparing the recorded, processed microseismic signals to the modeled expected vertical component in the predetermined area.

In an embodiment, the predetermined area is divided into a plurality of microgroups.

In an embodiment, the predicted subsurface earth structure corresponds to the study area. In an embodiment, the search objects comprise an underground reservoir.

In an alternative embodiment, a method for detecting and imaging subsurface search objects comprises processing recorded microseismic signals comprising waves with a vertical component and a horizontal component collected in a predetermined area by filtering noise in the recorded microseismic signals associated with a correlated horizontal wave component from the vertical wave component and filtering a narrowband harmonic component of the recorded microseismic signals.

The expected vertical component in the predetermined area is modeled by way of a seismic simulation that enables the propagation of seismic waves in a multiphase medium. The modeling is based on prior data for the predetermined area, including vertical seismic profile, depth and time maps, or elevation data.

A predicted subsurface earth structure is generated by comparing the recorded, processed microseismic signals to the modeled, expected vertical component in the predetermined area.

In an embodiment, the predetermined area is divided into a plurality of microgroups. In an embodiment, the predicted subsurface earth structure corresponds to the study area.

DETAILED DESCRIPTION OF THE DRAWINGS

Passive seismic data is used alongside other geophysical data to derive subsurface rock property models and create images. Passive low frequency seismic data fills the frequency gap below the active seismic data frequency range.

In reflection seismology, laterally-placed objects can have a significant influence on reflections of vertically propagated longitudinal compressional waves. The developed processing graph filters and removes major techno-noises after which the Green's function can be used to solve differential equations from the passive seismic observations and construct the image of vertically propagated longitudinal body waves that is present in the natural background ambient microseismic vibrations.

A method includes the application of the full-wave inversion of mechanical attributes of the study layers/formation using generalized information from the results of the seismic surveys, vertical seismic profile (VSP) and other relevant data. Also, the method allows for the inclusion of the geo-mechanical characteristics in the top part of the section. Alternative examples of passive low-frequency data analysis may be applied for determining the contour of hydrocarbon deposits, for example, as a direct hydrocarbon indicator (DHI).

Figure 1:
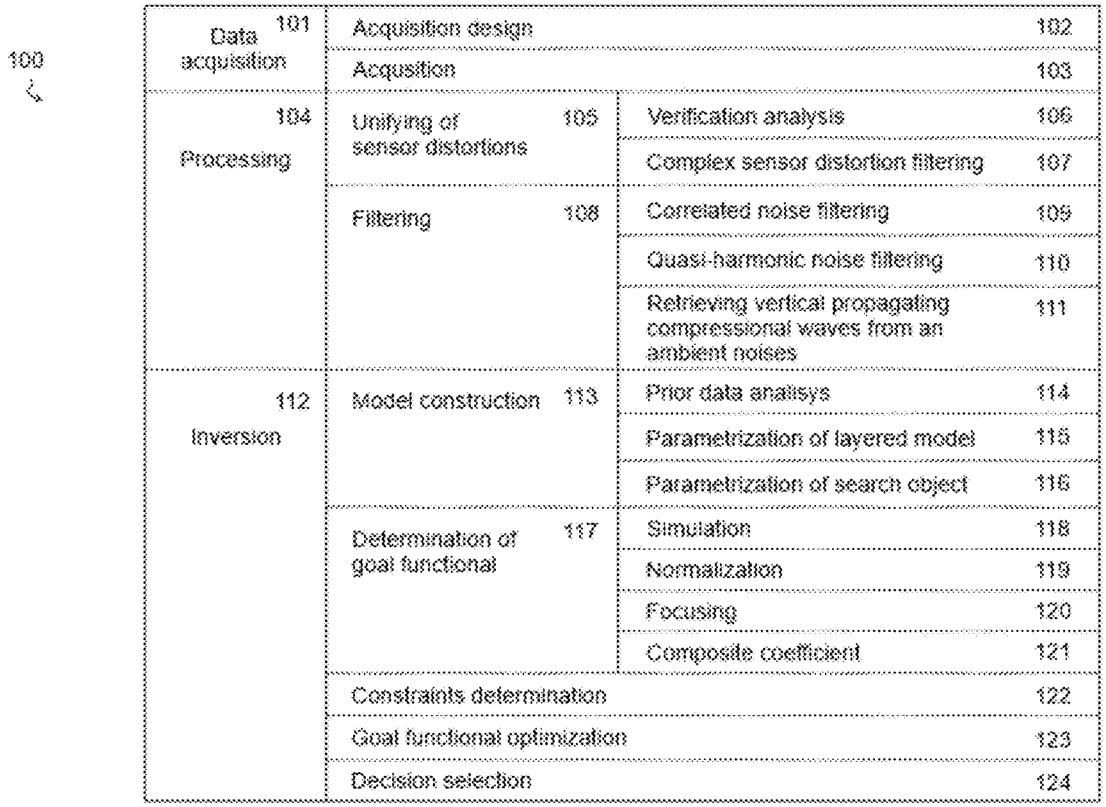
FIG. 1 is a flowchart of a method for using LFS techniques from acquisition to processing and inversion modelling, according to an embodiment.

FIG. 1 is flowchart showing operations of an exemplary method 100 for implementing LFS techniques from acquisition to processing and inversion modelling. The first operation is data acquisition 101, which comprises acquisition design 102 and acquisition 103.

The second operation is processing 104, which includes unifying of sensor distortions 105. Unifying of sensor distortions 105 comprises verification analysis 106 and complex sensor distortion filtering 107. Processing 104 also includes filtering 108, which comprises correlated noise filtering 109, quasi-harmonic noise filtering 110, and retrieving vertically propagating compressional waves from ambient noises 111.

Inversion 112 includes model construction 113, which comprises prior data analysis 114, parametrization of a layered model 115, and parametrization of a search object 116. Inversion 112 also includes determining a goal functional 117, which comprises simulation 118, normalization 119, focusing 120, and composite coefficient 121.

Inversion 112 further includes constrains determination 122, goal functional optimization 123, and decision select 124.

Figure 2:
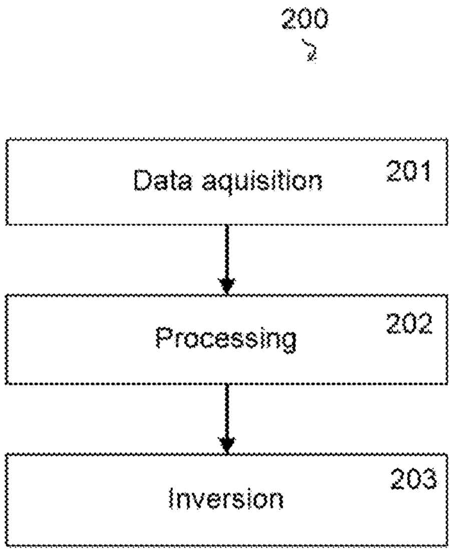
FIG. 2 is a block diagram showing operations for implementing LFS techniques, according to an embodiment.

FIG. 2 depicts a schematic overview of an exemplary method 200 for implementing LFS techniques. The main operations of the method comprise data acquisition 201, processing algorithms 202, and inversion routines 203. The operations of FIGS. 1 and 2 will be explained in detail below after the elements of FIGS. 3-6 have been introduced.

Figure 3:
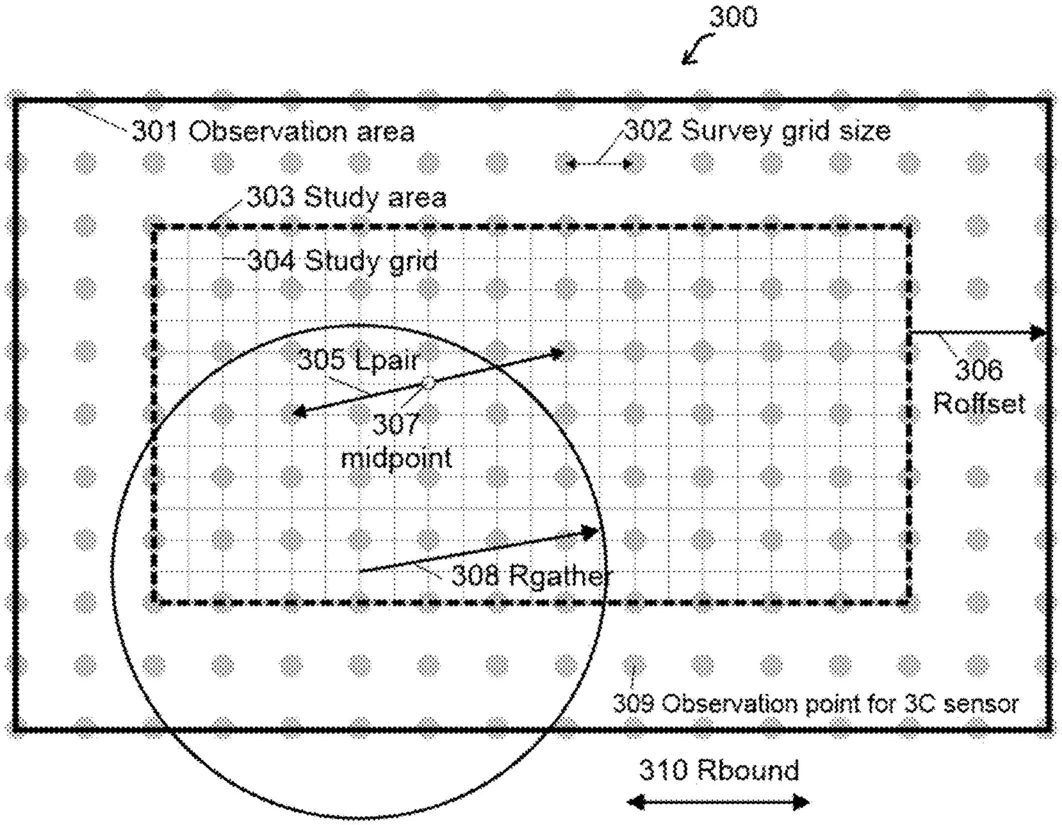
FIG. 3 is a schematic diagram of an exemplary sensor placement scheme for implementing LFS techniques, according to an embodiment.

FIG. 3 shows an embodiment of an observation scheme 300. An observation area 301 comprises a grid of size 302 arranged in a study area 303 investigated by study grid 304. In FIG. 3, Lpair 305 is the distance between simultaneously recorded sensors, which are used to build cross-correlation functions. Roffset 306 corresponds to outcomes of observation area 301 beyond the border of study area 303. Roffset 306 is marked as the distance from study area 303 to the boundary of observation area 301. In an embodiment, grid layouts are generally irregular.

Midpoint 307 refers to the central point for a pair of sensors to which the cross-correlation functions are assigned. Rgather 308 is the assembly radius of the midpoints 307 of the cross-correlation functions. Sensors 309 (grey circles) are schematically placed on a grid, which may not match a regular grid, having survey grid size 302. In an embodiment, sensors 309 are three-component (3C) (x,y,z)) sensors designed for three-component, low-frequency vibration monitoring. The value of Rbound 310 is calculated on Acquisition design stage 102 shown in FIG. 1 and represented in FIG. 3 for scale comparison. Rbound 310 will be explained in further detail in connection with FIG. 4 and determining boundary effect Rbound 403.

Figure 4:
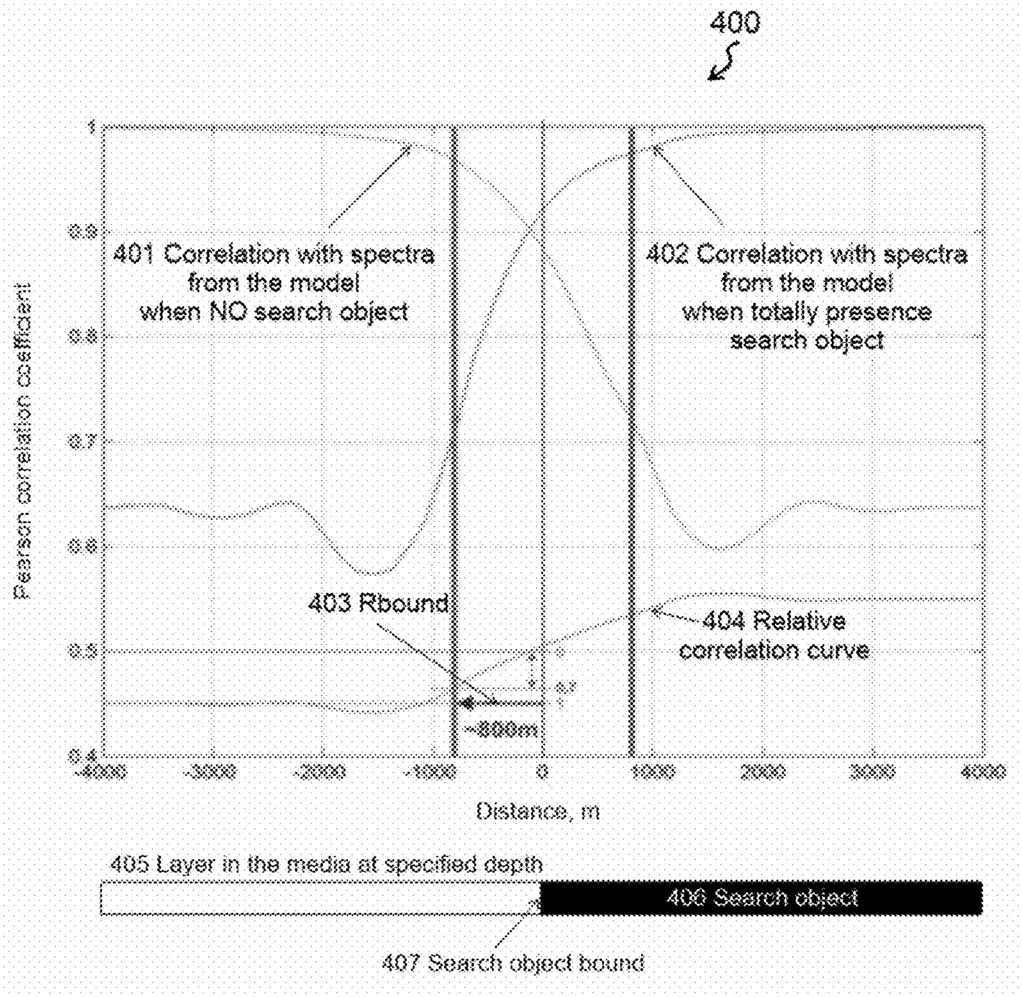
FIG. 4 is a schematic diagram for determining a boundary effect, according to an embodiment.

FIG. 4 is a schematic of an embodiment 400 of boundary-effect calculation using correlation 401 with spectra for the model when no search object is present and correlation 402 with spectra from the model when a search object is present. Boundary effect Rbound 403 is determined using 2d numerical simulation. Relative correlation curve 404 is calculated on the base of the correlation with spectra from the model when no search object is present 401 and when search object is present 402. Layer 405 represents a layer in the target media at a specified depth. Search object 406 is present in layer 405 and bounded by search object bound 407. Graphs of Pearson's correlation coefficients of the simulated spectra of simulated responses (on a flat impact on the top of the model) at the boundary 407 of the search object in the study layer of model 205 are presented. Previously, the response spectra of models were obtained in which the search object is completely absent 401 and the search object is completely present 402 (from the left border to the right border of the model at a specified depth 405). Rbound 403 is determined at a level of 0.7 of relative correlation curve 404.

Figure 5:
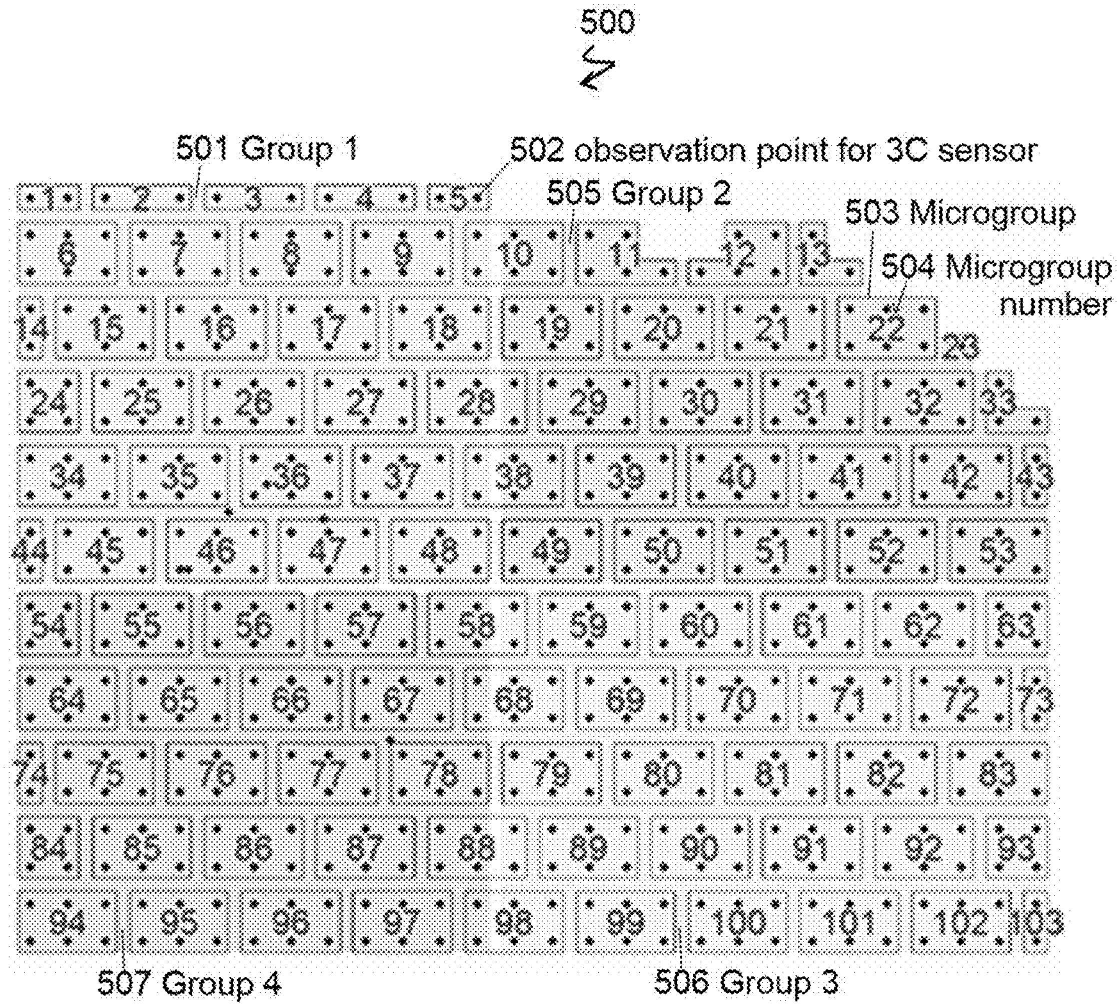
FIG. 5 is an alternative observation scheme using sensor microgroups, according to an embodiment.

FIG. 5 shows exemplary design 500 of an observation scheme for an implementation with a limited number of sensors 502. In an embodiment, 100 sensors are used. The area of observation is divided into 103 microgroups 503. Each microgroup 503 is assigned a microgroup number 504. In the exemplary embodiment of FIG. 5, 103 numbered microgroups are shown. In some embodiments, for each microgroup no more than one sensor records simultaneously. The installation of sensors is carried out in groups 501, 505, 506, 507. In FIG. 5, for example, group 1 (501) comprises microgroups in rows beginning with microgroups 1, 6, 14, 24, 34, and 44. The boundary between group 1 (501) and group 2 (505) may be in the middle of a microgroup, as shown by microgroups 10, 28, and 38. Group 4 (507) comprises microgroups in rows starting with 54, 64, 74, 84, and 94. The boundary between group 4 (507) and group 3 (506) is in the middle of microgroups 58, 68, 88, and 98.

In an embodiment, the four groups 501, 505, 506, and 507 are installed over the course of four days so that every day one group of approximately 25 sensors is installed. On the fifth day, the sensors of the first group 501 are reinstalled within microgroups of the first group, and so on.

Figure 6:
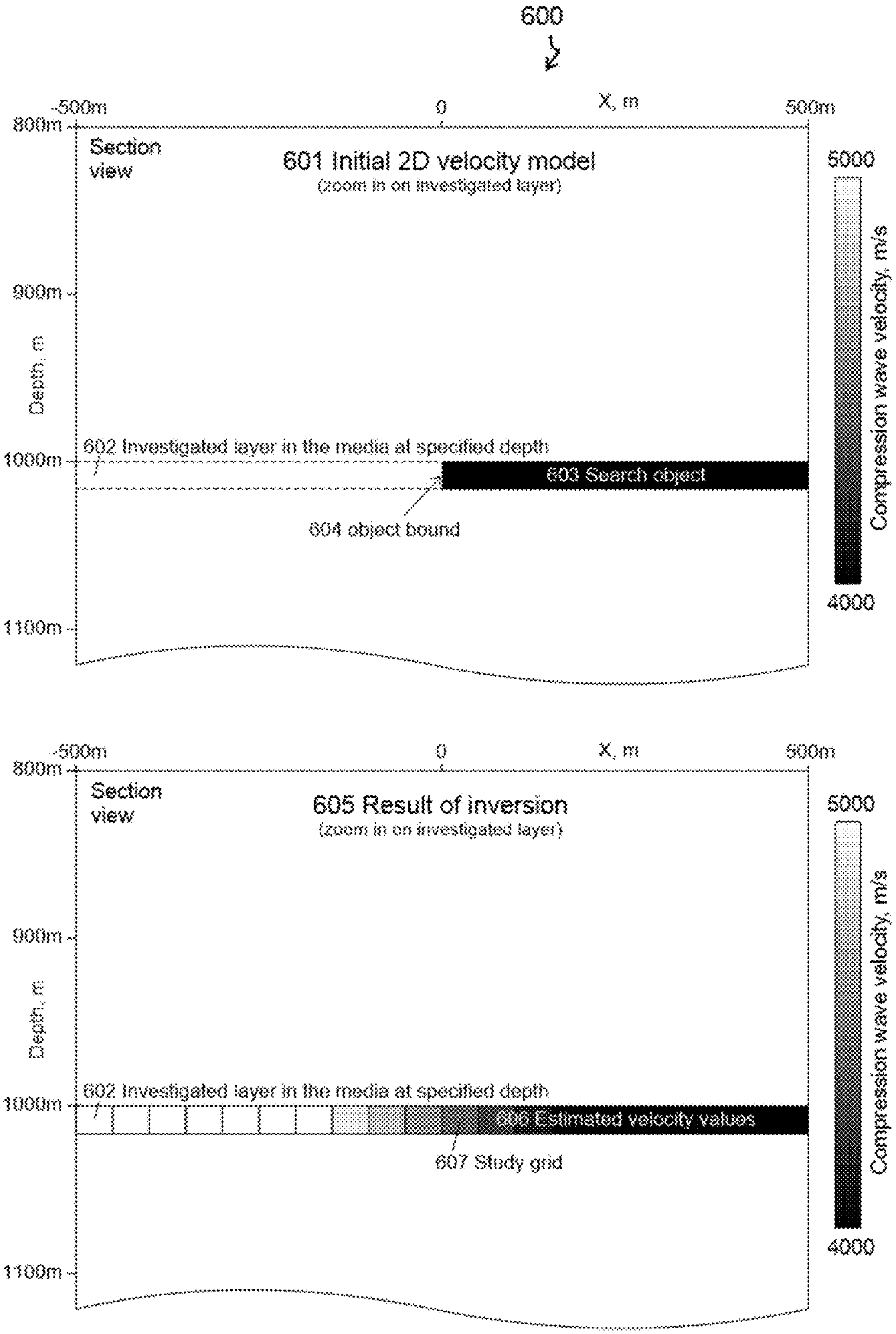
FIG. 6 is an illustration of a model demonstrating inversion techniques, according to an embodiment.

FIG. 6 shows results 600 of test model 601 demonstrating the inversion technique. The velocity of the background value is 5000 m/s. The value of the velocity in the investigated media layer 602, at the right side with search object 603, is 4000 m/s. At the left side of layer 602, the velocity is 5000 m/s. An example of the result of the inversion 605 is shown in the investigated layer 602 by study grid 607 with the estimated values 606 of velocity using the inversion technique.

An exemplary implementation will now be described with reference to the elements shown in FIGS. 1-6.

The properties of a geological environment are estimated with data acquired from several sensors deployed in a survey area. Multiple sensors distributed around each observation point 309 of study grid 304 are used to estimate subsurface rock properties in depth. The estimation of a rock or reservoir property is provided in a study area 303 by grid 304, that is different from the grid of observation area 301 where sensors 309 are installed. Estimation of properties in a node of study grid 304 of study area 303 is provided by processing of a group of simultaneously recorded sensors.

For pairs of simultaneously recorded data from 3C sensors 309, a cross-correlation tensor of ambient noise is calculated. The distance between sensors Lpair 305 may be limited by max length of Lpair to avoid overabundant calculations. The cross-correlation tensor is assigned to the middle point 307 of that pair of 3C sensors.

In specified radius Rgather 308 around projection of study area (volume node) 303 to the ground, all cross-correlation tensors are gathered for consequent estimation of the properties in this projection (X, Y) for depth of interest (Z).

The processing graph extracts the cross-correlation image of vertically-propagated compressional body waves using 2D or 3D simulations with redundancies. Simulations on complex 1D models are performed incorporating the multicomponent content of the reservoir and the viscoelastic properties of the model. A fast inversion of petrophysical properties of the reservoir is also performed.

Simulation in a multiphase environment obtains seismic responses for various petrophysical parameters of the search object, such as, porosity and saturation coefficients.

An improved processing graph is developed that allows for effective filter-out techno-noises and extraction of the vertically propagated compressional waves from the ambient background waves field. The processing graph includes quasi-harmonic interference filtering and filtering of correlated noise. The processing graph also includes extraction of the vertically propagated compressional wave from scattered waves, allowing for extraction of the spectra curves of vertically propagated waves with the best signal-to-noise ratio from the background microseismic record of simultaneously recording 3C sensors.

Using the inversion procedure, the properties of the search object are restored. These properties include, for example, porosity and saturation. The structure of the upper part of the section is further refined.

In an embodiment, the method used for data acquisition in an observation area allows for the processing and extracting of vertically propagating waves from a microseismic ambient background wave field. Filtering techniques allow for the extraction of vertically-propagating compressional waves from actual microseismic data. In an embodiment, the method includes the modelling of a multiphase medium that estimates the parameters of the search object. These parameters include properties of the rock-mass and the fluid that saturates the rock-mass. Inversion is then applied on the model of a multiphase medium to estimate of the properties of search objects.

Further details of the method shown in FIG. 1 will now be described. Data acquisition 101 comprises passive seismic techniques that use sensors, such as seismometers or geophones, to record ground motion or microseismic signal over an extended period of time. In an embodiment, the sensors are highly sensitive 3C sensors that will be deployed according to the design of the acquisition plan.

A predetermined number of sensors are typically selected before going into the field and registering microseismic signals. Other predetermined aspects include the study area, the observation area, and the step or distance between the sensors.

In an exemplary embodiment, the acquisition design methodology 102 comprises estimation of the border effect Rbound 403 using 2D-numerical simulation. This estimation can be achieved using analytical or empirical approaches.

In an analytical approach, the radius of boundary effect in lateral and vertical dimensions depends on the number of highest resonant modes that are used in the inversion and the depth of investigation. In an embodiment, Rbound could be around Depth*0.2.

In an empirical approach, a 2D model is created with seismic mechanical properties, and a search object, such as oil, is inserted at the target depth of investigation. Simulations are performed on the model. The responses, with and without a search object, are recorded and compared. The boundary effect between the two are estimated.

Survey grid size 302 can also be predetermined. In this determination, the minimal step (distance) of survey grid size is not limited but the maximal step (distance) of survey grid size is limited by the radius of boundary effect Rbound 403.

The determination of range of distance between simultaneously recorded sensors (Lpair 305) considers both minimal and maximal distance. The minimal distance between simultaneously recorded pairs of sensors is not limited. The maximal distance is chosen as a result of compromise between the anticipated resolution and statistical stability of the result. Long distances between sensors decrease the resolutions of the map but increase the numbers of cross-correlations between sensors which helps improve the quality of ambient noise filtering.

The determination of the radius of gathering (Rgather 308) at midpoint range between sensors recording simultaneously includes choosing Rgather 308 by balancing resolution and statistical stability of the result. A long radius decreases the resolutions of the map but increases numbers of cross-correlations for better quality ambient noise filtering.

Acquisition design continues by determining the offset border sensors outside the study area. The offsets of edge sensors (Roffset 306) of the observation grid 301 should be no less than Rgather 308 or no less than Rbound 403.

The duration of simultaneously recording sensors is yet another part of acquisition design. The duration of simultaneously recording sensors has an influence on the stability of the cross-correlation image and its processing, and also on the stability of the inversion and its result. Increased stability at high frequency range enables better inversion and increases the resolution of the result. In an embodiment, the duration of recording at observation point is no less than 18 hours.

The number of sensors available can also affect acquisition design. The consequences for the acquisition of using a limited number of sensors can be addressed by how the sensors are deployed. For example, the observation area could be divided into microgroups 503 as shown in FIG. 5. In each microgroup, only a set of sensors will be recording over a period of time. After the registration period has finished, each sensor can be installed at another observation point of the microgroup. In an alternative embodiment, reinstallation of sensors inside the microgroups is separated by several days. Each day, reinstallation is provided only in microgroups that are placed in the current group. The number of groups 501, 505, 506, and 507 determine the duration of the recording at each observation point. For example, if four groups are created, each group will record for four days at each observation point.

Processing operation 104 follows data acquisition operation 101. Processing operation 104 of FIG. 1 includes the unification of sensor distortion 105 to correct the characteristics of the sensor. The unification of sensor distortion 105 performs the verification analysis 106 and complex sensors distortions filtering 107. When different types of recording equipment are used, the frequency characteristics of the types of equipment are adjusted to a basic type of equipment by the verification record produced by verification analysis 106 and by implementation of inverse filters calculated by complex sensor distortions filtering 107 and their application.

The processing operation 104 also includes using a filtering module at operation 108 to perform correlated noise filtering 109 of the vertical component of at least one of the sensor records based on the accumulated correlation dependencies with at least one of the horizontal components. Filtering of the correlated noise of the vertical component of the sensor is performed with possible modifications. For example, noise filtering can be based on at least one record of the horizontal component of at least one additional sensor installed near the source of the seismic noise, for example, a pumping unit, a drilling rig, and others. Noise filtering can also be based on at least one record of the component of the same sensor.

Correlated noise from the Z-component of the record is removed. In this context, correlated noise refers to noise that is somehow related to other noise. Useful signal waves are those coming from below. These vertically directed compression waves should not be projected on the horizontal components of the sensors. The main task of correlated noise filtering is to remove waves that are present in both the vertical and horizontal components, including Rayleigh surface waves and waves inclined to the ground surface. This filter is also used in modifications. When an additional sensor is installed near a noise source, such as a pumping unit, the horizontal components of this "noisy" sensor are used as an example of a noise that is searched for (or correlated) in the vertical component of the "quiet" sensor. After applying this filter, the noise found in the Z component of the "quiet" sensor is deleted from the Z component. Alternatively, in the Z component of the current sensor, similarity is sought in the signals with the horizontal components of the same sensor, and everything that correlates is subtracted. In an embodiment, the useful signal should not correlate with the horizontal components, so it remains in the Z component. Thus, this filter allows for removal of high-amplitude waves coming from the side from a certain direction, which are not related to the useful signal.

Quasi-harmonic noise filtering operation 110 is used to subtract at least one harmonic component of a recording while preserving the background broadband components of the recording. The Quasi Harmonic Noise Filter is a tool that subtracts the harmonic "noise" component from the signal, while retaining the useful background signal with the random nature of the sources. The background noise is a type of noise that is characterized by a broadband frequency spectrum that contains the signal of interest. Its primary source may be random sources on the surface and at depths which do not correlate with each other.

In processing this frequency spectrum, narrowband interference strongly distorts the structure of the spectrum. Interference is filtered out to preserve the background component and without creating a dip in the spectral response.

A third filtering operation 111 comprises retrieving vertical propagating compressional waves from the ambient noises of the microseismic record of a group of simultaneously recording sensors. By this filtering, vertically directed waves in the medium can be detected, because they must correlate with neighboring sensors in the Z component. In other words, vertically directed waves should arrive simultaneously on the Z components of neighboring sensors, within a certain radius around 100 to 1000 m. In this case, surface waves should arrive with a delay relative to each other. The retrieving algorithm makes it possible to suppress the scattered component of the surface wave against the background of the synchronous vertically directed wave. The filtering process comprises a number of distinct operations. In an embodiment, all the filtering operations discussed below are part of the filtering algorithm. In other embodiments, less than all filtering operations are performed.

The filtering algorithm comprises excluding broadband interference. Recording sections with a high noise level in the operating frequency band are rejected or excluded. Broadband interference is excluded from processing because recording sections with a high noise level do not contain useful signals and are usually formed by sources close to the sensor such as noise originating from wind, cars, train traffic, and so on.

For each study point, pairs of records of real-world observations are gathered in the vicinity of the projection of the study point onto the observation area within a certain radius. The need to highlight the synchronous component of a signal in two records is met by calculating the cross-correlation function between two simultaneous records of different pairs of sensors spaced over the area. In this process, all possible options for assembling pairs of sensors are defined. These pairs can be used to build cross-correlation functions.

For each pair of 3C records in the assembly, the accumulation of the tensor of cross-correlation functions V1N2, V1E2, V2N1, V2E1 is performed. Here the cross-correlation functions are calculated not only from the Z-components of two sensors, but also the cross-correlation functions between the vertical and horizontal components of the sensors in a pair.

The surface wave is suppressed with the help of accumulated cross-correlation functions. For example, by using the tensor of cross-correlation functions, the scattered component of the Rayleigh surface wave is suppressed. Such suppression is desirable because there are many scattered components of surface waves in the background noise. The removal of the scattered component of the Rayleigh wave reduces harmful interference for the useful vertically directed compression waves.

Cross-correlation functions in which at least one of the pairs of sensors has a high noise level are rejected. Some cross-correlation functions accumulated in the assembly are very noisy, with a high level of cross-correlation signal amplitudes. Noisy sensor pairs are rejected relative to all sensor pairs in the assembly, which allows for reliance on sensor pairs with the quietest recording areas. In this context, the quietest recording areas are those with non-noisy local noise sources.

Another aspect of the filtering algorithm is performing anti-symmetrization of the cross-correlation functions. This procedure removes additional noise in cross-correlation functions. According to the conditions of the problem, the cross-correlation function of a vertically directed wave should not depend on which sensor is the "main" one. When correlating from the first to the second or vice versa, the same result should be obtained.

The filtering algorithm further comprises smoothing the assembly of cross-correlation functions by a rolling window along the ordinal number of the function, sorted by the distance between the sensors in a pair. Additional rejection of outliers from the assembly of cross-correlation functions of responses, similar to median filtering, leads to an increase in the stability of the result.

The algorithm also comprises performing filtering on the collection of cross-correlation functions to exclude the inclined component in the gathering of cross-correlation functions. Filtering is applied to suppress oblique waves in cross-correlation assemblies (time to distance between sensors). Oblique waves manifest atypical behaviour for vertically directed waves.

Inversion 112 refers to passive seismic inversion, which is used to infer the subsurface structure of the earth using naturally occurring seismic waves. FIG. 1 shows an embodiment of the process as applied from model construction 113 where prior data is analyzed 114 to create a set of parameters for the layered model and search objects 115 and 116 to determine the goal functions 117 which leads to simulation 118.

A model is constructed that is as close to reality as possible. The task of inversion is to clarify some unknown parameters of search objects. More accurate models require fewer parameters to select and there is less uncertainty in estimating the parameters of search objects. Model construction 113 includes prior data analysis 114. This analysis includes the qualification and analysis of prior subsurface data such as VSP, active seismic depth and time maps, elevation data and other information.

Parameterization of model 115 proceeds in the context of 1D modeling. The model is represented as a flat parallel media in any vicinity of the study point. Layers of the model can be described with different parameters such as Vp, thickness, attenuation, and others including multiphase characterization. Parametrization of properties of a search object 116 is performed by selecting relevant parameters of the search object from the variants of model properties.

The goal function can be described as the discrepancy between the actual spectra (data acquired in the field) and model spectra (data acquired from numerical simulation). Determining the goal function 117 includes simulation 118. Simulation is a method used to model and predict the behaviour of constructed geophysical model 113. It involves creating a mathematical or computer-based representation of the model and using this representation to predict how the model will behave under different conditions.

The forward problem is the task of determining the parameters of the environment (oil deposit or section properties) by the simulation of seismic response. An inverse problem solution is based on multiple forward problem solutions. To solve the forward problem, a numerical simulation is performed. Instead of 2D or 3D numerical simulations, the simulation module implementing operation 118 reduces the dimensions to 1D (vertical) because vertically propagating longitudinal waves are the focus of the method.

The simulation operation 118 includes a simulation module that enables the propagation of seismic waves in a multiphase medium. Seismic simulation in a multiphase medium is intended for a forward problem of a seismic wave process in porous media including several phases of matter interacting with each other, such as rock frame and filling fluid. Seismic simulation in a multiphase environment is allowed to simulate seismic responses depending on various petrophysical parameters of the reservoir (porosity, permeability, oil saturation).

The inversion technique is applied in estimating the properties of the investigated media. FIG. 6 shows a model that demonstrates an implementation of the inversion technique. Normalization operation 119 is performed after simulation 118. After the simulation is performed, the actual amplitude Fourier spectra curves are filtered and then normalised at operation 119 to the shape of the simulated responses.

Focusing operation 120 refers to focusing the normalised amplitude Fourier spectra responses to the different depths of study.

Composite coefficient operation 121 refers to a calculation whereby, after focusing the Fourier spectra responses to target depths, the composite coefficient operation 121 of dissimilar spectral characteristics is calculated.

The last three operations of the inversion technique are constraints determination 122, goal functional optimization 123, and decision selection 124. Constraints determination operation 122 is performed by setting a limitation on physical values of estimated parameters.

Goal functional optimization 123 is performed by optimization algorithms, for example, genetic algorithms (GA).

Decision selection 124 is performed by choosing the final variant of decision that represents the values of estimated parameters. This choice can be made by selecting the best goal functional value and by averaging the values of clusters from the best cloud of decisions.

The invention claimed is:

1. A method for detecting and imaging a subsurface search object, the method comprising:

positioning a plurality of sensors in a predetermined area and simultaneously recording ambient microseismic signals with the plurality of sensors, the ambient microseismic signals comprising at least a vertical component and a horizontal component;

processing the ambient microseismic signals including by:

filtering correlated noise from the vertical component using at least one horizontal component of at least one of the sensors;

filtering at least one quasi-harmonic interference component while preserving a broadband background component of the recorded ambient microseismic signals;

excluding record sections contaminated by broadband interference;

for a plurality of pairs of simultaneously recording sensors, computing pairwise cross-correlations from the recorded ambient microseismic signals and forming a cross-correlation tensor from the pairwise cross-correlations;

using the cross-correlation tensor derived from the pairwise cross-correlations to suppress a scattered surface-wave component and extract a response corresponding to vertically propagating compressional waves from the recorded ambient microseismic signals; and filtering gathered pairwise cross-correlation data to exclude inclined-wave components-correlation functions;

generating a modeled response corresponding to vertically propagating compressional waves in the predetermined area by seismic simulation in a multiphase medium, wherein the seismic simulation is based on prior data for the predetermined area; and estimating at least one property of the subsurface search object by comparing the extracted response corresponding to vertically propagating compressional waves with the modeled response corresponding to vertically propagating compressional waves.

2. The method of claim 1, wherein the plurality of sensors are positioned in a generally irregular grid and the predetermined area comprises an observation area and a study area, the study area located within the observation area.

3. The method of claim 2, wherein the subsurface search object corresponds to the study area.

4. The method of claim 2, wherein the plurality of sensors are configured for simultaneous recording for a duration sufficient to stabilize the pairwise cross-correlations.

5. The method of claim 2, wherein at least two of the plurality of sensors positioned in the generally irregular grid comprise a pair having a midpoint between the pair, and the cross-correlation tensor derived from the pairwise cross-correlations for the pair is associated with the midpoint.

6. The method of claim 1, wherein the predetermined area is divided into a plurality of microgroups.

7. The method of claim 2, wherein the subsurface search object comprises an underground reservoir.

8. A system for detecting and imaging a subsurface search object, the system comprising:

a plurality of sensors configured to simultaneously record ambient microseismic signals in a predetermined area, the ambient microseismic signals including at least a vertical component and a horizontal component;

a processing module configured to process the ambient microseismic signals including by:

filtering correlated noise from the vertical component using at least one horizontal component of at least one of the sensors;

filtering at least one quasi-harmonic interference component while preserving a broadband background component of the recorded ambient microseismic signals;

excluding record sections contaminated by broadband interference;

computing pairwise cross-correlations for a plurality of pairs of simultaneously recording sensors and forming a cross-correlation tensor derived from the pairwise cross-correlations;

using the tensor derived from the pairwise cross-correlations to suppress a scattered surface-wave component and extract a response corresponding to vertically propagating compressional waves from the recorded ambient microseismic signals; and filtering gathered pairwise cross-correlation data to exclude inclined-wave components;

a simulation module configured to:

generate a modeled response corresponding to vertically propagating compressional waves in the predetermined area by seismic simulation in a multiphase medium, wherein the seismic simulation is based on prior data for the predetermined area; and estimate at least one property of the subsurface search object by comparing the extracted response corresponding to vertically propagating compressional waves with the modeled response corresponding to vertically propagating compressional waves.

9. The system of claim 8, wherein the plurality of sensors are positioned in a generally irregular grid and the predetermined area comprises an observation area and a study area, the study area located within the observation area.

10. The system of claim 9, wherein the subsurface search object corresponds to the study area.

11. The system of claim 9, wherein the plurality of sensors are configured for simultaneous recording for a duration sufficient to stabilize the pairwise cross-correlations.

12. The system of claim 9, wherein at least two of the plurality of sensors positioned in the generally irregular grid comprise a pair having a midpoint between the pair, and the cross-correlation tensor derived from the pairwise cross-correlations for the pair is associated with the midpoint.

13. The system of claim 8, wherein the predetermined area is divided into a plurality of microgroups.

14. The system of claim 8, wherein the subsurface search object comprises an underground reservoir.

15. A method for detecting and imaging a subsurface search object, the method comprising:

processing simultaneously recorded ambient microseismic signals comprising at least a vertical component and a horizontal component collected in a predetermined area including by:

filtering correlated noise from the vertical component using at least one horizontal component;

filtering at least one quasi-harmonic interference component while preserving a broadband background component of the recorded ambient microseismic signals;

excluding record sections contaminated by broadband interference;

for a plurality of pairs of simultaneously recording sensors, computing pairwise cross-correlations from the recorded ambient microseismic signals and forming a cross-correlation tensor from the pairwise cross-correlations;

using the tensor derived from the pairwise cross-correlations to suppress a scattered surface-wave component and extract a response corresponding to vertically propagating compressional waves from the recorded ambient microseismic signals; and filtering gathered pairwise cross-correlation data to exclude inclined-wave generating a modeled response corresponding to vertically propagating compressional waves in the predetermined area by seismic simulation in a multiphase medium, wherein the seismic simulation is based on prior data for the predetermined area; and estimating at least one property of the subsurface search object by comparing the extracted response corresponding to vertically propagating compressional waves with the modeled response corresponding to vertically propagating compressional waves.

16. The method of claim 15, wherein the ambient microseismic signals are recorded by a plurality of sensors positioned in a generally irregular grid and the predetermined area comprises an observation area and a study area, the study area located within the observation area.

17. The method of claim 15, wherein the subsurface search object corresponds to the study area.

18. The method of claim 15, wherein the ambient microseismic signals are recorded for a duration sufficient to stabilize the pairwise cross-correlations.

19. The method of claim 16, wherein at least two of the plurality of sensors positioned in the generally irregular grid comprise a pair having a midpoint between the pair, and the cross-correlation tensor derived from the pairwise cross-correlations for the pair is associated with the midpoint.

20. The method of claim 15, wherein the predetermined area is divided into a plurality of microgroups.

* * * * *